(12) United States Patent
Arquette et al.

(10) Patent No.: US 8,924,326 B2
(45) Date of Patent: Dec. 30, 2014

(54) METHODS AND SYSTEMS FOR OPTIMIZING MESSAGES TO USERS OF A SOCIAL NETWORK

(75) Inventors: Lex Arquette, San Jose, CA (US); David Y. Chen, Mountain View, CA (US); Emily Grewal, Palo Alto, CA (US); Denise Moreno, San Jose, CA (US); Florin Ratiu, Mountain View, CA (US); Yanxin Shi, Palo Alto, CA (US); Kiranjit Singh Sidhu, East Palo Alto, CA (US); Ching-Chih Weng, Newark, CA (US); Huan Yang, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 234 days.

(21) Appl. No.: 13/485,784

(22) Filed: May 31, 2012

(65) Prior Publication Data

US 2013/0325755 A1   Dec. 5, 2013

(51) Int. Cl.
*G06F 17/00*   (2006.01)

(52) U.S. Cl.
USPC .......................................................... 706/45

(58) Field of Classification Search
USPC ......................................... 706/12, 20, 45, 62
See application file for complete search history.

(56) References Cited

U.S. PATENT DOCUMENTS

| 2010/0268716 A1* | 10/2010 | Degaugue et al. | 707/741 |
| 2011/0106895 A1* | 5/2011 | Ventilla et al. | 709/206 |
| 2013/0031489 A1* | 1/2013 | Gubin et al. | 715/753 |
| 2013/0159502 A1* | 6/2013 | Thompson | 709/224 |

* cited by examiner

*Primary Examiner* — David Vincent
(74) *Attorney, Agent, or Firm* — Fenwick & West LLP

(57) ABSTRACT

Techniques to optimize messages sent to a user of a social networking system. In one embodiment, information about the user may be collected by the social networking system. The information may be applied to train a model for determining likelihood of a desired action by the user in response to candidate messages that may be provided for the user. The social networking system may provide to the user a message from the candidate messages with a selected likelihood of causing the desired action.

21 Claims, 8 Drawing Sheets

╭─ 316

| Mon | Tue | Wed | Thu | Fri | Sat | Sun |
|-----|-----|-----|-----|-----|-----|-----|
| 5%  | 11% | 5%  | 5%  | 11% | 26% | 37% |

FIGURE 4A

METHODS AND SYSTEMS FOR OPTIMIZING MESSAGES TO USERS OF A SOCIAL NETWORK

FIELD OF THE INVENTION

The present application relates to social networking and, in particular, systems and methods for optimizing content and timing of messages sent to users of a social network.

BACKGROUND

Social networking websites provide a dynamic environment in which members can connect to and communicate with other members. These websites may commonly provide online mechanisms allowing members to interact within their preexisting social networks, as well as create new social networks. Members may include any individual or entity, such as an organization or business. Among other attributes, social networking websites allow members to effectively and efficiently communicate relevant information to their social networks.

A member of a social network may highlight or share personal information, news stories, relationship activities, music, and any other content of interest to areas of the website dedicated to the member. Other members of the social network may access the shared content by browsing member profiles or performing dedicated searches. Upon access to and consideration of the content, the other members may react by taking one or more responsive actions, such as providing an opinion about the content, or other feedback. The ability of members to interact in this manner fosters communications among them and helps to realize the goals of social networking websites.

In order to increase engagement of users, social networking websites may send messages to users to encourage them to engage in activity of the social networking website. These messages may expressly or impliedly suggest that the user visit the social networking website or take a particular action in connection with the social networking website. However, if the messages are received by the user at an inopportune time, or if the message includes content that does not interest the user, the message may be ignored by the user, or otherwise may not be effective in encouraging the user to use the social networking website.

SUMMARY

To increase user engagement with a social networking system, embodiments of the invention include systems, methods, and computer readable media to optimize messages sent to a user of a social networking system. Information about the user may be collected by the social networking system. The information may be applied to train a model for determining likelihood of a desired action by the user in response to at least one candidate message that may be provided for the user. The social networking system may provide for the user a message from the at least one candidate message with a selected likelihood of causing the desired action.

In an embodiment, the information about the user includes demographics related to the user, behavior of the user, and behavior of the user's friends. The behavior of the user can include responses, from the user, to messages sent by the social networking system. The behavior can also include dates and times of the user's activity.

In an embodiment, the model can compute scores representing likelihoods that each of the candidate messages will cause the desired action by the user. The selected likelihood can be associated with a highest probability of causing the desired action by the user. The model can be continuously or periodically updated with changed information about the user, including the responses by the user to messages sent by the social networking system.

Many other features and embodiments of the invention will be apparent from the accompanying drawings and from the following detailed description.

BRIEF DESCRIPTION OF THE DRAWINGS

FIGS. 4A-4B illustrate scores generated by a model in accordance with an embodiment of the invention.

Figure 1:
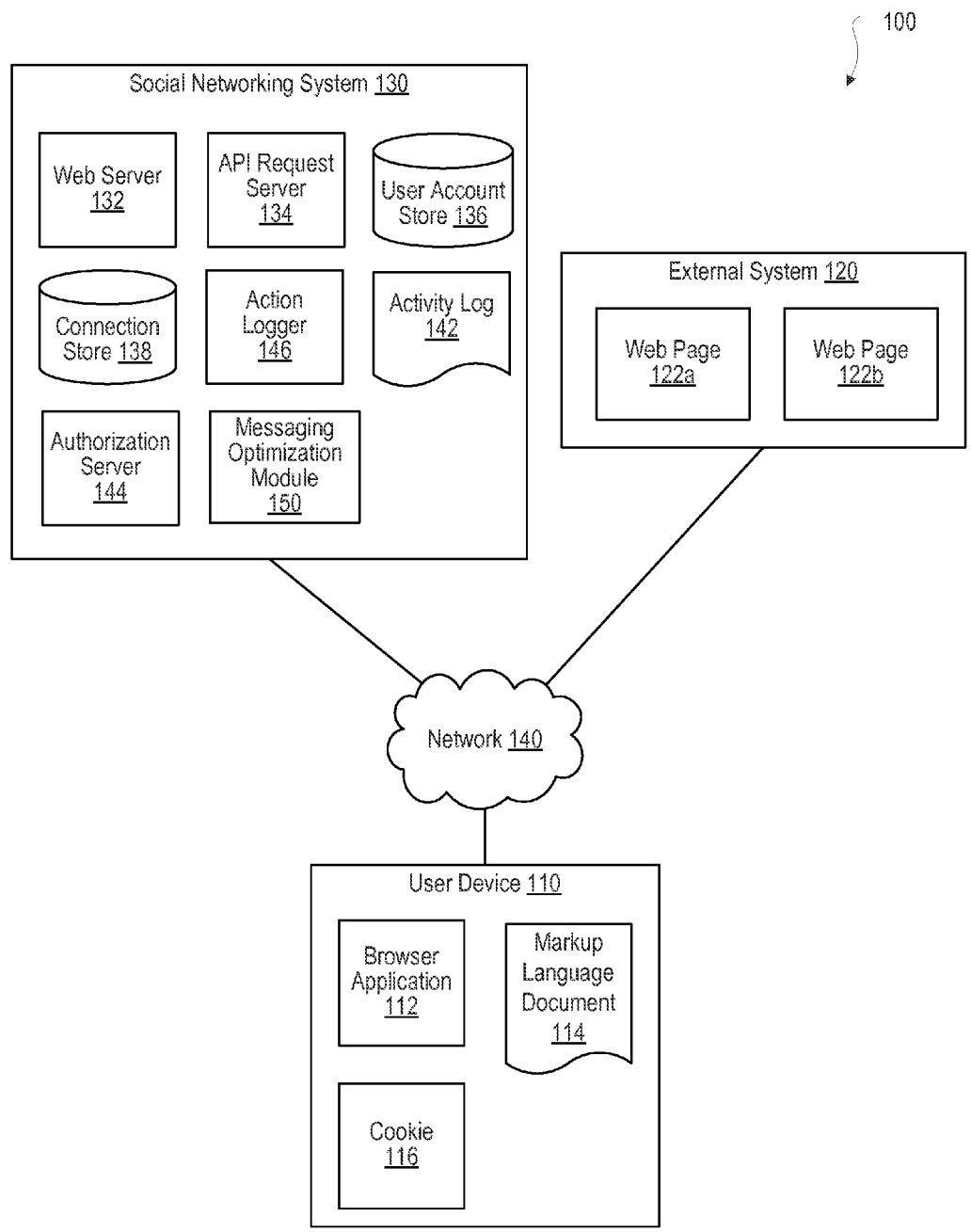
FIG. 1 is a network diagram of a system for increasing engagement with a social networking system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social Networking System—General Introduction

FIG. 1 is a network diagram of a system 100 for increasing engagement of users with a social networking system 130 in accordance with an embodiment of the invention. The system 100 includes one or more user devices 110, one or more external systems 120, the social networking system 130, and a network 140. For purposes of illustration, the embodiment of the system 100, shown by FIG. 1, includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform or backbone, which other systems, such as external systems 120, may use to provide social networking services and functionalities to users across the Internet.

The user device 110 comprises one or more computing devices that can receive input from a user and transmit and receive data via the network 140. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 140. The user device 110 can execute an application, for example, a browser application that allows a user of the user device 110 to interact with the social networking system 130. In another embodiment, the user device 110 may interact with the social networking system 130 through an application programming interface (API) provided by the native operating system of the user device 110, such as iOS and ANDROID. The user device 110 is configured to communicate with the external system 120 and the social networking system 130 via the network 140, which may comprise any combination of local area and/or wide area networks, using wired and/or wireless communication systems.

In one embodiment, the network 140 uses standard communications technologies and protocols. Thus, the network 140 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 140 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 140 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

The markup language document 114 may also include, or link to, applications or application frameworks such as FLASH™ or Unity™ applications, the SilverLight™ application framework, etc.

In one embodiment, the user device 110 also includes one or more cookies 116 including data indicating whether a user of the user device 110 is logged into the social networking system 130, which may enable customization of the data communicated from the social networking system 130 to the user device 110.

The external system 120 includes one or more web servers that include one or more web pages 122a, 122b, which are communicated to the user device 110 using the network 140. The external system 120 is separate from the social networking system 130. For example, the external system 120 is associated with a first domain, while the social networking system 130 is associated with a separate social networking domain. Web pages 122a, 122b, included in the external system 120, comprise markup language documents 114 identifying content and including instructions specifying formatting or presentation of the identified content.

The social networking system 130 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. For example, in an embodiment, if users in the social networking system 130 are represented as nodes in the social graph, the term "friend" can refer to an edge formed between and directly connecting two user nodes.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of the social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via services provided by or through the social networking system 130, and interactions with advertisements that a user may perform on or off the social networking system 130. These are just a few examples of the items upon which a user may act on the social networking system 130, and many others are possible. A user may interact with anything that is capable of being represented in the social networking system 130 or in the external system 120, separate from the social networking system 130, or coupled to the social networking system 130 via the network 140.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user account store 136, a connection store 138, an action logger 146, an activity log 142, an authorization server 144, and a messaging optimization module 150. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user account store 136 maintains information about user accounts, including biographic, demographic, and other types of descriptive information, such as work experience, educational history, hobbies or preferences, location, and the like that has been declared by users or inferred by the social networking system 130. This information is stored in the user account store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user account store 136 and the connection store 138 store instances of the corresponding type of objects maintained by the social networking system 130. Each object type has information fields that are suitable for storing information appropriate to the type of object. For example, the user account store 136 contains data structures with fields suitable for describing a user's account and information related to a user's account. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user account store 136, assigns a unique identifier to the user account, and begins to populate the fields of the user account with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user account store 136 and the connection store 138 may be implemented as a federated database.

Data stored in the connection store 138, the user account store 136, and the activity log 142 enables the social networking system 130 to generate the social graph that uses nodes to identify various objects and edges connecting nodes to identify relationships between different objects. For example, if a first user establishes a connection with a second user in the social networking system 130, user accounts of the first user and the second user from the user account store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user account store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 140. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 140, and the API request server 134 receives the API request. The API request server 134 processes the request by calling an API associated with the API request to generate an appropriate response, which the API request server 134 communicates to the external system 120 via the network 140. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 146 is capable of receiving communications from the web server 132 about user actions on and/or off the social networking system 130. The action logger 146 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's account, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 146 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122*a* within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

The social networking system 130 may also include the messaging optimization module 150 for optimizing messages (also referred to as communications) sent to a user. Messages can be emails, SMS, texts, instant messages, chat messages, or any type of message that can be sent to the user. Such messages can include a digest of information. In other words, the social networking system 130 can accumulate information and activity over time that may be of interest to a user, and include a summary of such information in a message sent to the user. Messages can also include notifications. A notification may be an email or other type of message that is sent to a user upon the occurrence of an event. Notifications can be used, in some circumstances, to inform a user of an event immediately or soon after the event takes place.

Messages (also referred to as communications) sent to the user by the social networking system 130 may generally be used to encourage or entice the user to increase engagement with the social networking system 130, or to encourage the user to take a particular action or series of actions in connection with the social networking system 130. For example, notification messages may inform the user of comments and feedback from other users regarding content posted by the user. The feedback may encourage the user to revisit the social networking system 130 to see what other users and friends have said about the user's content. Although feedback and comments have been used as an example of information that can be included in messages, other information can be included as well. For example, messages can contain lists of friends, lists of potential friends, activity of friends, group invitations, event invitations, etc. Messages containing such information can also be sent to the user to encourage other reactions from the user. For example, messages can be sent to the user to invite the user to join or participate in a group, event, or discussion. Messages can also be sent to encourage the user to connect to additional friends, to view interesting content, to play social network-related games, etc. In general, messages can be sent to the user to encourage the user to participate, or increase participation, in any aspect of the social networking system 130.

In order to encourage the user to react to the messages, it may be desirable for the social networking system 130 to optimize messages sent to the user. For example, if a user enjoys viewing a particular type of content, messages that include that type of content, or inform the user that the type of content is available on the social networking system 130, may be more effective at encouraging the user to log into and/or engage with the social networking system 130. Similarly, if a user typically logs into the social networking system 130 at a particular time, e.g., a particular time of day and/or a particular day of the week, then messages sent to the user at a specified time may be more effective at encouraging the user to log into the social networking system 130. In some cases, a message sent to the user a few hours (e.g., 3 hours) before the user usually logs into the social networking system 130 can increase the likelihood that the user will log into the social networking system 130 at the usual time. Accordingly, the social networking system 130 may include messaging optimization module 150 to optimize the content included in a message and the time the message is sent, to encourage users to log into and/or engage in activity on the social networking system 130.

Messaging Optimization

Figure 2:
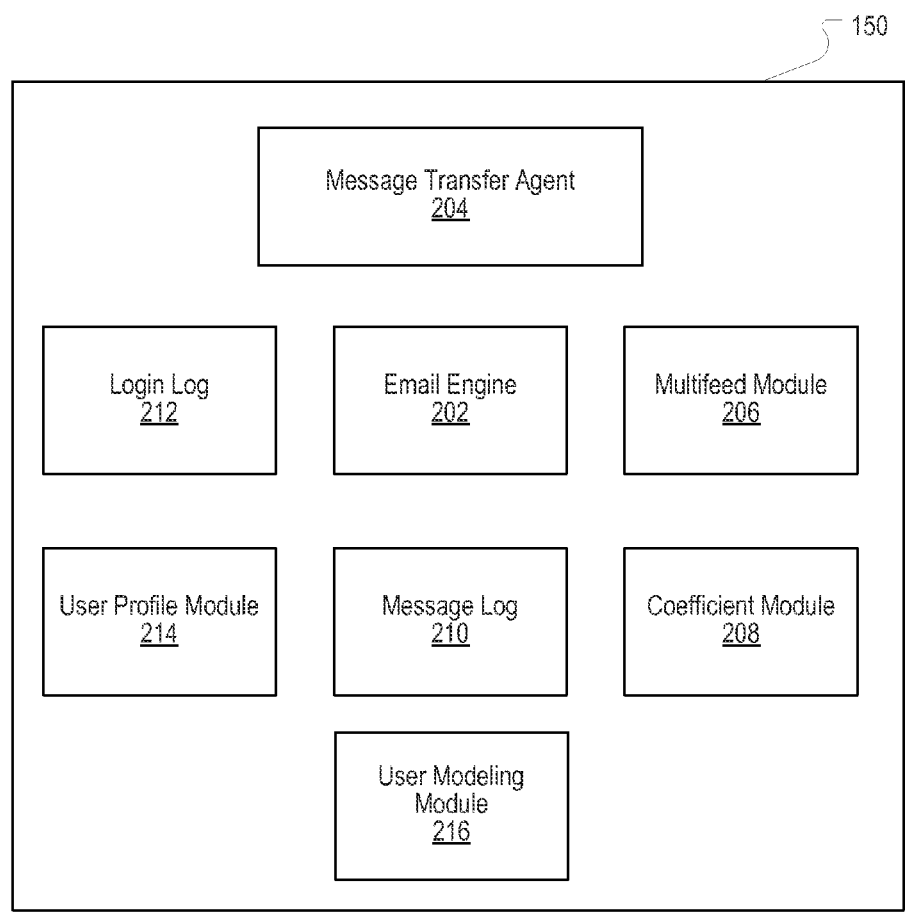
FIG. 2 is a block diagram of a messaging optimization module of the social networking system in accordance with an embodiment of the invention.

FIG. 2 is a diagram of the messaging optimization module 150 of FIG. 1 in accordance with an embodiment of the invention. The messaging optimization module 150 can implement a machine learning scheme. In other words, the messaging optimization module 150 can be trained, based on user responses to messages, to optimize the messages sent to the user. In order to implement machine learning, the messaging optimization module 150 may monitor and record information about a user in order to create a profile of the user. The profile of a user includes information such as demographics of the user, as well as actions and behavior of the user and friends of the user on the social networking system 130. The messaging optimization module 150 can also create a model of the user that can be used to anticipate or predict whether a message sent at a particular time, and a message that includes particular content, will be effective in eliciting a desired response or reaction from the user. The desired response may include any action or actions, such as clicking on a link in the message, logging into the social networking system 130, joining a group, responding to a friend request, sending a friend invitation, providing feedback, viewing content on the social networking system 130, commenting on content posted within the social networking system 130, etc. The prediction can be a score, ranking, or probability that the message will cause the desired response from the user. By using the prediction, the messaging optimization module 150 can optimize the time the messages are sent, and the content contained in the messages, to increase the effectiveness of the messages in producing the desired response or reaction from the user.

The messaging optimization module 150 includes an email engine 202, a message transfer agent (MTA) 204, a multifeed module 206, a coefficient module 208, a message log 210, a login log 212, a user profile module 214, and a user modeling module 216. In an embodiment of the invention, the functions performed by the components (e.g., logs, engines, modules, etc.) shown in FIGS. 1 and 2 may be variously replaced by, combined with, or integrated into other components. The social networking system 130 may include additional, fewer, or different components for various applications. Other components such as network interfaces, security mechanisms, load balancers, failover servers, management and network operations consoles, and the like are not shown so as to not obscure the details of the system.

The email engine 202 controls the provision of messages through the message transfer agent (MTA) 204 to a user of the social networking system 130 based on information exchanged with the multifeed module 206, the coefficient module 208, the message log 210, and the login log 212. The user profile module 214 and the user modeling module 216 can act to optimize the content and/or timing of messages sent to the user. In an embodiment, the message transfer agent (MTA) 204 may provide messages to a user who receives such messages through, for example, email, SMS, or a message system external to the social networking system 130, such as the external system 120.

The coefficient module 208 may be used in identifying particular friends of the user whose activities may be considered in determining the timing and content of messages sent by the social networking system 130 to the user. The coefficient module 208 can provide coefficients as measures of relatedness between nodes in the social graph of the social networking system 130. For example, coefficients may indicate that a user is closer to her best friend than to another person befriended by the user. In some instances, coefficients may provide, or use, weights for edges between nodes in the social graph to determine relatedness. For example, a greater weight may be given to a particular friend of the user if that friend and the user have a high number of common friends, to a particular friend of the user if that friend frequently comments on the status of the user or of another friend of the user. The coefficient module 208 may store raw features about interactions between nodes, and has trained algorithms based thereon to provide general purpose functions to provide rankings, intelligence, suggestions, and recommendations.

The message log 210 maintains information about messages provided by the social networking system 130 to the user. The message log 210 may include transactional information, such as the category and type of messages sent to the user, as well as the activities that prompt or trigger provision of the notifications. The message log 210 also may include information regarding the date and time the messages are provided to the user. In an embodiment of the invention, the message log 210 may be implemented as a database table.

The multifeed module 206 may provide other types of information about the social network of a user. The multifeed module 206 may manage and track information about activities of friends and other contacts of the user. For example, the multifeed module 206 may provide information about status information posted by friends. Status information may include temporary information published by a friend of the user that reflects the current thoughts and expressions of the friend. By its nature, posted status information may change frequently and the multifeed module 206 tracks such changes. As another example, the multifeed module 206 may also track information about photos and videos that are posted by friends of the user.

The multifeed module 206 may also track stories concerning friends of the user. Stories may include various actions taken by the friends in the social network. For example, a story may involve one or more friends "liking" the photo of another friend. As another example, a story may involve one or more friends "liking" the status of another friend. In addition to the information described herein, other types of information also may be tracked by the multifeed module 206.

The login log 212 maintains information regarding the history of engagement by a user with the social networking system 130. The engagement information maintained by the login log 212 may include information regarding the date and times of prior visits by the user to the social networking system 130. The engagement information may also include the date and time of the last visit by the user to the social networking system 130. In an embodiment of the invention, the login log 212 may maintain other types of engagement information, such as the history of logins to the social networking system 130 by the user or the history of certain acts or actions taken by the user.

The email engine 202 may compare information from the login log 212 and the user modeling module 216, with one or more predetermined time intervals to determine whether to provide a message to the user. In particular, the email engine 202 may retrieve from the login log 212 the date and time of the last engagement of the user with the social networking system 130, and/or the date and time of the last email sent to the user by the email engine 202. Email engine 202 may also retrieve from the user modeling module 216 an optimized time to send a subsequent email or other type of message. If the time since the last engagement and/or the time since the last email is more than one or more predetermined time intervals, the email engine 202 causes the message to be provided to the user. In some cases, the email engine 202 will cause the message to be provided to the user at the optimized time retrieved from the user modeling module 216.

The user profile module 214 may identify, monitor, and record features such as the behavior of the user, demographics of the user, and behavior of friends of the user. These features, as well as other information about a user, can be monitored and recorded in order to create a profile about the user and how she uses the social networking system 130. The profile can then be used to model the user's behavior, and predict how the user will react to messages or other stimulus provided by the social networking system 130.

The behavior monitored by the user profile module 214 can include the time that a user is active, or most active, on the social networking system 130, including, for example, the time of day, the day of the week, and the day of the month that the user is active (or most active) on the social networking system 130. For example, if a user typically logs in each Saturday night at or around 7:00 PM, but rarely or never logs in on Monday mornings at 10:00 AM, the user profile module 214 can monitor and record such activity.

The behavior monitored and recorded by the user profile module 214 can also include the type of activity in which the user engages. For example, the user profile module 214 can monitor whether a user plays games, interacts with friends, posts content, listens to music, joins a group, reads articles, comments on other users' content, or engages in other types of activity on the social networking system 130. The timing of the user's behavior also may be recorded by the user profile module 214.

In an embodiment, the behavior recorded by the user profile module 214 can include the user's reactions to messages sent to the user. As an example, the user profile module 214 can record, after the user receives a message such as an email from the social networking system 130, whether the user clicks a particular link among many links included in the email. The links within the email can, for example, present a webpage of the social networking system 130 or cause the user to take some other action desired by the social networking system 130. The user profile module 214 can also record whether, after the user has received a message, the user has taken no action with respect to the message. The user profile module 214 can also monitor the types of messages, and the times that the messages were sent, that result in the greatest probability of responses from the user. For example, a user may respond more often to emails that contain information about the user's friends' status updates, and may respond less often to emails that contain information about pictures posted on the social networking system 130. The user profile module 214 can record such information for use in the user's profile. As another example, a user may respond more often to emails that are sent at 10:00 AM, and less often to emails that are sent at 8:00 PM. Again, the user profile module 214 can record such information in the user's profile, so that it can be used to predict how a user will respond to various types of messages. By incorporating the user responses to messages into the user's profile, the social networking system 130 can learn to optimize messages sent to the user.

In order to identify and record user behavior, the user profile module 214 may monitor and record user activity over a period of time. The period of time may be based upon a desired period or frequency of activity. For example, in order to determine whether a user typically logs in on Saturday nights, the user profile module 214 may monitor, record, and compile the usage habits and behavior of the user over a period of, for example, 100 days, or a longer or shorter period of time. In this way, the user profile module 214 can monitor activity on a number of different Saturday nights to determine if the user typically logs in on Saturday nights. As another example, in order to determine the time of day at which a user is most active on the social networking system 130, the user profile module 214 may monitor, record, and compile the usage habits and behavior of the user over, for example, a period of days. In this way, the user profile module 214 can record the user's activity over a period of days to determine what time of day the user is typically the most active on the social networking system 130. The user profile module 214 can also monitor the amount of user activity during a period of time. For example, the user profile module 214 can monitor how many days a user was active, and how many days a user was inactive, over a predetermined time period (e.g., a 100 day period). As another example, the user profile module 214 can monitor the extent of the activities of the user over a predetermined period of time. The foregoing sample activities and periods of time are provided for illustration.

The user profile module 214 can monitor and record data about users for any desired type or extent of activity over any desired period of time, such as any suitable number of days, weeks, months, years, etc. The desired period of time may allow the social networking system 130 to maintain a profile of the user that reflects current usage by the user of the social networking system 130. Information about messages, and the user's reactions to messages, can also be monitored and recorded by the user profile module 214. The user profile module 214 may monitor the date and time of the last message sent to the user, the total number of messages sent to the user, the type and content of messages sent to the user, the number of invitations to join a group that have been sent to the user, etc. For example, if the user was sent a notification on Friday evening that another user liked her status, the user profile module 214 can record such information and include it as part of the user's profile. As another example, if a message sent to the user provided links for the user to see news stories, friend requests, or notifications from other users in the social networking system 130, the user profile module 214 can record which links the user selected.

The user profile module 214 can also maintain and monitor demographics about a user. For example, demographics may include, but are not limited to, birthplace, birth date, hometown, current town, locale, time zone, country of residence or citizenship, age, race, weight, height, marital status, or gender of a user. Demographics can also include income level, type of job, educational achievements such as degrees earned and schools attended, etc. These types of information may, in some instances, be used by the social networking system 130 to create an accurate profile of the user.

Demographics can also include attributes and information about the user's account on the social networking system 130. For example, the user profile module 214 can monitor the number of friends of the user, the number of outstanding messages or notifications that the user has read or has not read, the number of outstanding friend requests received or sent by the user, etc.

The activity of a user's friends can also constitute a part of the user's profile. As such, the user profile module 214 can monitor and record information about the user's friends. For example, if a user's friends log onto the social networking system 130, or are otherwise active on the social networking system 130 at a particular time, or on a particular day of the week, the user profile module 214 can include that information in the user's profile. Similarly, if the user's friends engage in particular activities on the social networking system 130 (e.g., playing games, viewing content, etc.), or if the user's friends post or like particular content, the social networking system 130 can include such information in the user's profile. The dates and times of the activities of the user's friends can also be monitored and recorded. In general, the user profile module 214 can monitor and include any activity of a user's friends in the user profile so as to create a more accurate profile of the user.

The user profile module 214 can continuously or periodically monitor and record user and friend activity and demographics so that the user profile module 214 can update the user profile over time, as the activities and demographics change. For example, a particular user may log in most often on Saturday nights. Say, for example, that the user's work schedule changes so that it is no longer convenient for the user to log in on Saturday nights. The user may stop logging in as frequently on Saturday nights, and may begin logging in more often on Monday nights. In this example, the user profile module 214 can continuously or periodically monitor the user's login habits and behavior over time to determine that the user's habits and behavior have changed from logging in on Saturday nights to logging in on Monday nights.

In an embodiment, the user profile module 214 can receive and monitor information about the user by retrieving such information from the user account store 136. As described above, the user account store 136 can maintain information, including demographics and activity, related to a user account.

By collecting and compiling activity and demographics relating to a user, the user profile module 214 can create a user profile that estimates or approximates the preferences of the user. The user profile can be used to predict how a user will respond to messages based on their content and timing, as well as the likelihood that the user will take desired action in response to such messages.

The user modeling module 216 may use the information collected by the user profile module 214 (e.g., the user profile) to create a model of a user. The model may be, for example, a software program, software function, algorithm, or any other suitable functionality or tool that can be used to predict behavior of the user. In an embodiment, the model can provide a prediction (e.g., a score or a probability) of how the user will react to messages sent by the social networking system 130.

The user modeling module 216 can incorporate any information about the user collected by the user profile module 214 into the model. As discussed above, such information can include, but is not limited to, the activity of the user on the social networking system 130, the activity of the user's friends on the social networking system 130, and demographics about the user.

Known reactions of a user can also be incorporated into the model. For example, the data collected in a user profile may show that, if a user first registered with the social networking system 130 or typically logs into the social networking system 130 at a particular time of the day, the user is even more likely to log in at that time if the social networking system 130 sends a message to the user at a predetermined duration of time beforehand, such as three hours or any other suitable duration of time. The user profile module 214 may monitor the number of times the user logs in after the message is sent. Then, the user modeling module 216 can compare that number with the number of times the user logs in if no message is sent or if a message is sent at varying times prior to the user logging in. The user modeling module 216 can also compare the number of times the user logs in when the message is sent three hours before a typical login time, five hours before a typical login time, or any predetermined time period before the user's typical login time.

The user modeling module 216 can also compare the reaction of the user to various types of content sent in an email. For example, the user modeling module 216 can compare whether the user more or less frequently clicks on a link to the social networking system 130, or logs into the social networking system 130 based on whether the message contains stories about friends of the user, content posted by friends of the user, news articles commented on by friends of the user, etc.

If the message is a digest, the user modeling module 216 can record the type of content the user clicked within the digest. Digests are messages sent to the user that can include compilations or summaries of different types of content and activity that has taken place on the social networking system 130. In an embodiment, the content of the digest can be organized into different sections, each section containing a different summary. For example, sections in a digest can include a list of friends, a summary of popular stories, a summary of friend requests, a summary of notifications, etc. In an embodiment, the sections and summaries included in a digest can vary from message to message.

User reactions to a digest, including the section within the digest that invoked the user reaction, can be recorded and incorporated by the user modeling module 216 into the user model. For example, if a user clicks on a summary of popular stories within the digest, the social networking system 130 can record the fact that the user clicked on the section within the digest related to popular stories. Such information, when incorporated into the user model, can indicate that the user has an increased likelihood of reacting to summaries of popular stories. Similarly, the user clicking on other sections within the digest can be incorporated into the model to indicate that the user has a preference for those other sections that were clicked.

The user modeling module 216 can use the recorded information to create a model that predicts how the user may react to the timing and content of new messages. In an embodiment, the user modeling module 216 may create a model per user, i.e., a model for one user of the social networking system 130 or for every user of the social networking system 130. The model may be used to predict how a user will react to the timing and content of messages from the social networking system 130.

In another embodiment, the user modeling module 216 may create a model for a type of user. Such a model may be used to predict reactions of multiple users who fall into a particular class or category. For example, the user modeling module 216 may create a model that represents the typical behavior of users who reside on the west coast of the United States. As another example, the user modeling module 216 may create a model for users between 20 and 30 years old who listen to a certain genre of music. Any other category of user may also be used to create such a model. A model that represents a type of user may be useful to predict how a particular population of users will react to messages from the social networking system 130 based on their timing and content.

Once a model representing a user is created, the user modeling module 216 may modify and update the model based upon changes to the user's activity, the user's demographics, and activity of the user's friends on the social networking system 130. For example, if a user typically logs into the social networking system 130 on Saturday evenings at 5:00 PM, the user profile may reflect this activity. However, if the user's activity changes so that the user stops logging into the social networking system 130 on Saturday evenings at 5:00 PM, and begins logging into the social networking system more often on Sunday afternoons at 2:00 PM, then the user modeling module 216 can adapt or modify the model for that user to reflect the user's new activity, habits and behavior. Although the example above uses login time of the user, the user modeling module 216 can adapt or update the model based on any change to user activity, user friend activity, or user demographics.

Figure 3:
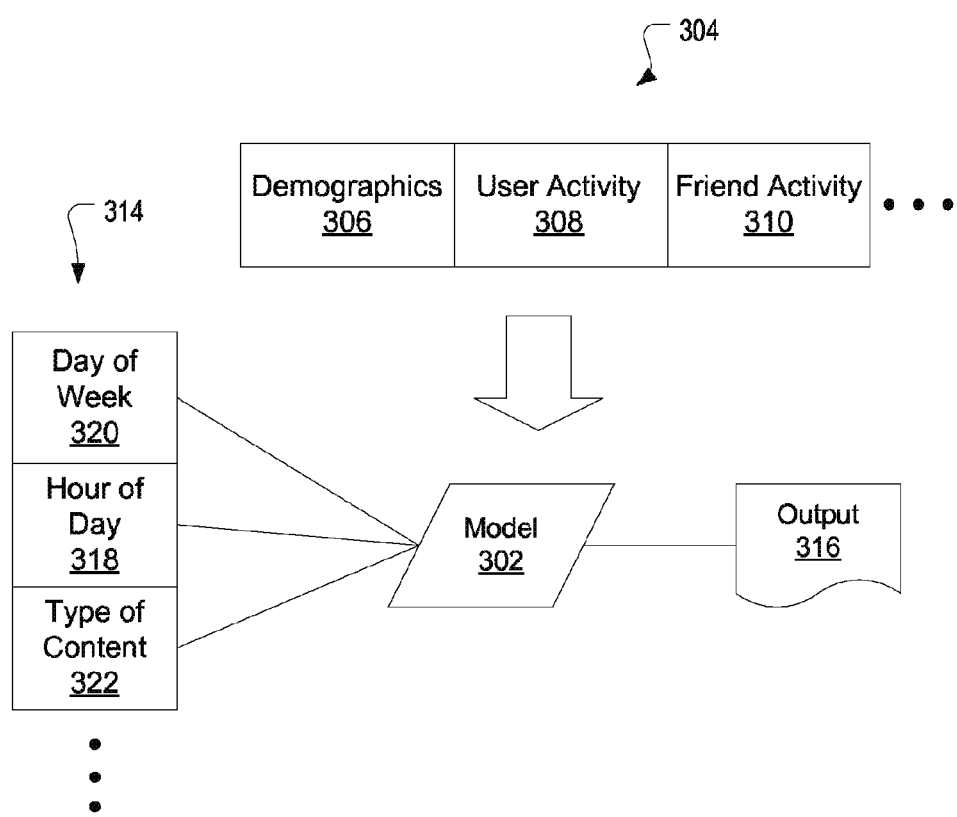
FIG. 3 illustrates a model in accordance with an embodiment of the invention.

FIG. 3 shows an example of a model 302 that may be generated by the user modeling module 216. The model 302 can be based upon a user profile 304, which can include features such as user demographics 306, user activity 308, and activity of friends of the user 310. The user profile 304 can also include other information, as discussed above, that can be used by the model 302 to predict user reactions.

The model 302 may receive various inputs 314. In an embodiment, the inputs 314 can represent various attributes of, or related to, a message that may influence whether the user will react to the message as desired by the social networking system 130. For example, it may be useful to determine if and how a user will react to a message sent by the social networking system 130 at a particular hour of the day and on a particular day of the week. In this example, inputs representing an hour of the day 318 or inputs representing the day of the a week 320 may be provided to the model 302. An output 316 provided by the model 302 may represent a prediction (e.g., a probability) that the user will react to a message sent at a particular time of day or day of the week.

As another example, it may be useful to determine if and how a user will react to particular types of content within a message sent to a user. In this case, data representing types of content 322 to be included in a message can be provided to the model 302 as inputs. The model 302 may then use the information from the user profile 304 to produce an output 316 that represents the likelihood that the user will react to the types of content 322.

The inputs 314 can also be combined, as desired, so that the output 316 can provide information about how the user will react to various combinations of message attributes. For example, it may be desirable to determine what time the message should be sent, what day of the week the email should be sent, and what content the message should contain so that the message has the highest likelihood of eliciting a response from the user. Accordingly, in this example, the input 314 may include the hour of the day 318, the day of the week 320, and the types of content 322. The model 302 can produce the output 316 that includes the likelihood of the user responding to various combinations of the inputs 314. For example, the output 316 may show that a particular user is most likely to respond to messages containing friend requests that are sent between 3:00 PM and 4:00 PM in the afternoon on Sundays. As another example, the output 316 may show that a type of user is most likely to provide a desired response to an email when the email is sent before 10:00 PM on weekday evenings and contains news stories of family members.

In an embodiment, any suitable inputs in addition to the hour of the day 318, the day of the week 320, and the types of content 322 may be included in the inputs 314 provided to the model 302. Such inputs may include, but are not limited to, games the user can play, other users that the user can befriend, groups the user can join, articles that the user can read, etc. The inputs may be provided to the model individually or in any suitable combinations.

In an embodiment, the output 316 may provide a score or scores that represent the likelihood that a user will react to a particular input 314. FIG. 4A shows an example of the output 316 that includes scores. In this example, the social networking system 130 may be preparing to send a message to the user based on the model 302. In order to optimize the effectiveness of the message, the social networking system 130 may use the model 302 to determine on which day the message should be sent. Accordingly, the day of the week 320 may be provided as an input to the model 302. As shown in FIG. 4A, the output 316 of the model 302 may provide a score for a candidate message that could potentially be sent on each day of the week. In FIG. 4A, the score for each candidate message corresponding to each day is shown in the bottom row, just below each day of the week. As shown, the model 302 for this particular user produced, for the candidate messages, a score of 5% for Monday, 11% for Tuesday, 5% for Wednesday, 5% for Thursday, 11% for Friday, 26% for Saturday, and 37% for Sunday. These scores may represent the likelihood that the user modeled by the model 302 will react, as desired, to the message, based on which day the message is sent. Since the score for Sunday is the highest, the model may predict that the message should be sent on Sunday in order to have the highest likelihood of inducing a desired reaction from the user, such as clicking on a link in the message, logging onto the social networking system 130, joining a group listed in the message, etc. In some instances, it may be desirable to send a message to the user that will not invoke a response. In this case, the social networking system 130 can send the message to the user on Monday, Wednesday, or any time the probability of invoking a response from the user is relatively low.

In an embodiment, the score produced by the model 302 may be a relative score. In other words, the model 302 may provide a relative score or rank that shows which input has the highest (or lowest) likelihood of causing a response, as compared to the likelihood of the other inputs. For example, in FIG. 4A, Sunday may have the highest relative score, with respect to the other days that were provided as inputs to the model 302. In another embodiment, the score produced by the model 302 may be an absolute score or probability. In other words, the model 302 may produce a score of 50%, for example, to indicate a 50% probability that a user will react to a particular message, without providing any comparison or ranking with respect to scores for other inputs.

Figure 4B:
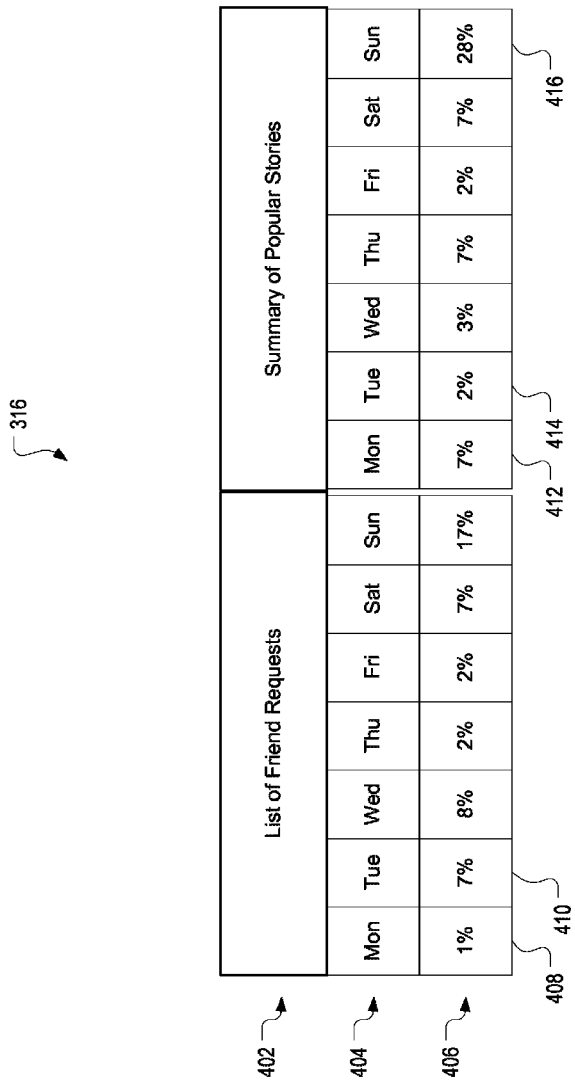

FIG. 4B shows another example of scores, corresponding to candidate messages that potentially may be sent to a user, that can be determined by the model 302. In FIG. 4B the output 316 includes scores based on combinations of two variables provided as inputs to the model 302. For example, a top row 402 shows one input as the type of content to be included in a message. A middle row 404 shows a second input as the day of the week on which to send the message. A third row 406 shows the scores produced by the model 302. The scores are associated with each combination of input. For example, the score in box 408 shows a likelihood that the user will respond to messages sent on Monday (from row 404) that include a list of friend requests (from row 402). Box 410 shows a likelihood that a user will respond to messages sent on Tuesday that include a list of friend requests. Similarly, box 412 shows a likelihood that a user will respond to messages sent on Monday that include a summary of popular stories, and box 414 shows a likelihood that a user will respond to messages sent on Tuesday that include a summary of popular stories. In this example, box 416 indicates that, of all the combinations of inputs in rows 402 and 404, the user has the highest likelihood of responding to messages sent on Sundays that include summaries of popular stories.

Although FIG. 4B shows scores for a combination of two inputs, the model 302 can produce scores for any number of inputs, combined in any suitable combinations. For example, if the inputs of the day of the week and the hour of the day are combined, the model 302 can produce scores that represent the likelihood that a user will respond to candidate messages for each hour of the week. The social networking system 130 may use such scores to determine the optimal hour of the week to send a message to a particular user. Any combination of any inputs can be used so that the model 302 can produce scores for optimizing messages sent to a user.

Additionally, although the scores are shown in FIGS. 4A and 4B as percentages, it is understood that the model 302 can provide scores and rank the likelihood of the user reacting to various inputs in any appropriate way. For example, the scores may be expressed as integers, real numbers, fractions, or any other suitable numerical or quantitative forms. As another example, the scores may be expressed in non-numerical or qualitative forms (e.g., "very likely", "not likely", "more probable", "less probable", etc). Also, although the scores are shown with respect to days of the week, the scores may also be used to score and rank hours of the day, hours of the week, days of the month, months of the year, the type of content to be included in the messages, any other information relating to the message, or any combination thereof.

Figure 5:
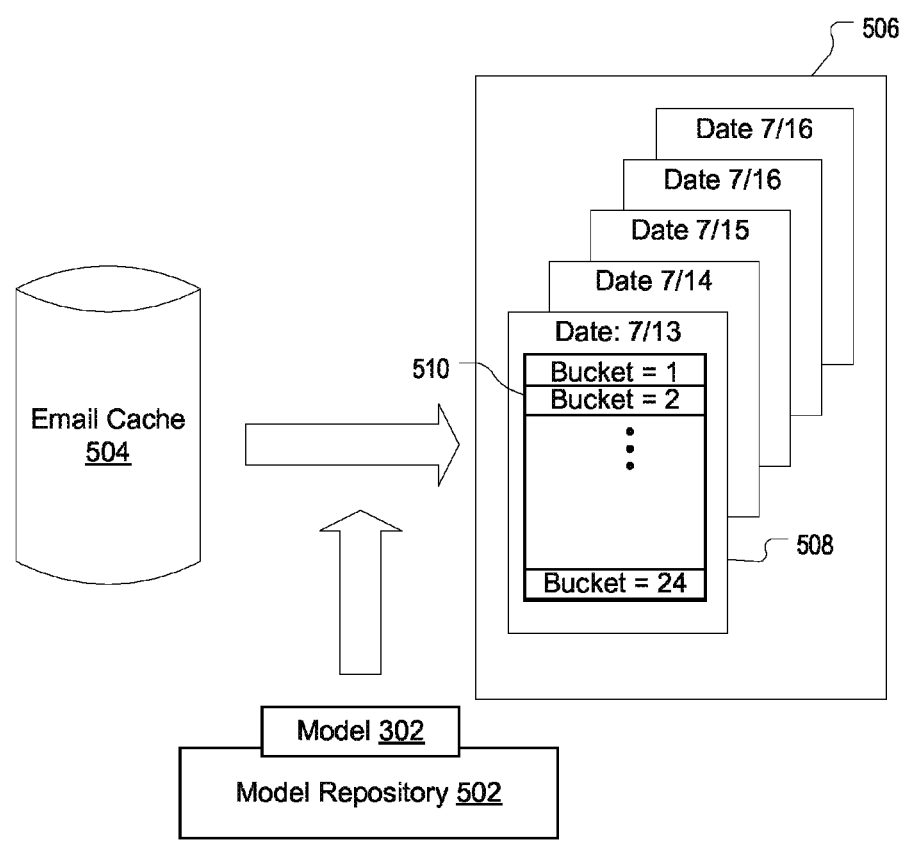
FIG. 5 illustrates a model used to batch emails in accordance with an embodiment of the invention.

FIG. 5 shows an example of how the model 302 may be used within the social networking system 130. As described above, the social networking system 130 may periodically send emails to users of the social networking system 130. The emails may be tailored for and provided to each user on a dedicated basis. In an embodiment, the social networking system 130 may create an email cache 504 that contains emails to be sent to users of the social networking system 130. In another embodiment, the emails need not be cached. In order to optimize what time to send the emails, and what content to include in the emails, the social networking system 130 may create models for each user of the social networking system 130, such as the model 302. The model 302 can be used to predict the best time to send the email and the best content to include in the email in order to increase the likelihood that the user will respond or react to the email as desired. These models can be stored, for example, in a model repository 502. For each email, the social networking system 130 can use a model from the model repository 502 that can predict the response of the recipient to the email based on the timing and content of the email. The emails can be tailored to include the content most likely to elicit a desired response from that particular recipient. The emails can be individually sent to each user on a dedicated basis, as discussed above, or sorted or batched so that the emails are sent out in groups on the date and time most likely to elicit a response or reaction from each user. An email batch 506 can include batches for emails that are to be sent out on different days, batches for different hours of the day, batches for different hours of the week, batches for different days of the month, etc. As shown in FIG. 5, the emails may be batched according to the day they are to be sent and according to the hour of the day they are to be sent. For example, the emails to be sent in a batch 508 on July 13 between 1:00 AM and 2:00 AM may be batched in a bucket 510. The social networking system 130 can then process the batched emails and send them to the recipients at the scheduled date and time.

Referring again to FIG. 2, the user profile module 214 and the user modeling module 216 can also use the reactions of users to the messages to train the model 302 in connection with machine learning. As noted above, the user profile module 214 can monitor and record user responses to messages sent by the social networking system 130. These responses can include clicking a link in the message, logging onto the social networking system 130, joining a group, etc. Such responses can be included in a user profile and used to tailor or train the model 302 to provide more accurate predictions of user responses. For example, assume that the average user is most likely to respond to an email sent three hours before the time she usually logs into the social networking system 130. However, assume further that a particular user (User A) differs from the average user. In User A's case, User A is more likely to respond to an email sent six hours before she usually logs into the social networking system 130. In this case, the user profile module 214 can record User A's response to messages sent three hours, and six hours, prior to User A's usual login time, and include those responses in the profile. The profile can then reflect User A's preference for responding as desired to emails that are sent six hours prior to her login time. This information can be incorporated into the model 302 for User A by user modeling module 216. The output 316 and scores produced by the model 302 can then reflect the higher likelihood of User A to respond to messages sent six hours prior to User A's login time. By incorporating user responses into the user profile and the model 302, the social networking system 130 can continuously tailor and update each model 302 to more accurately reflect the likelihood that a user will respond to messages sent by the social networking system 130.

Figure 6:
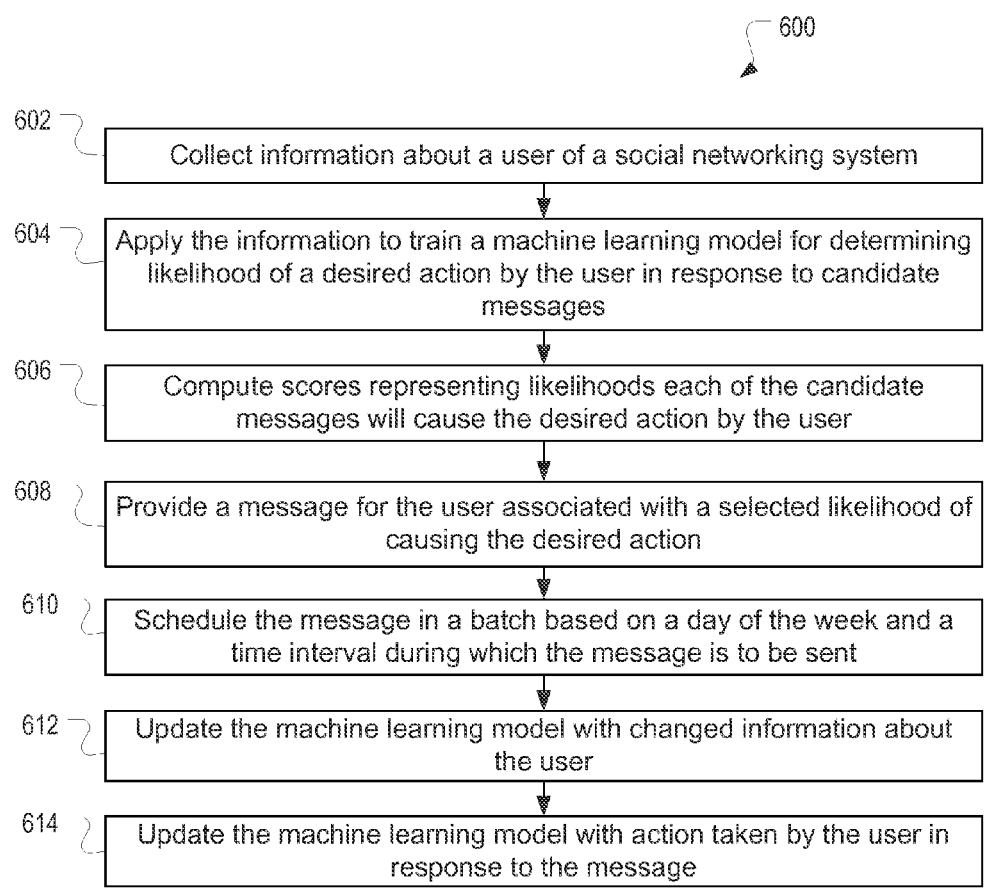
FIG. 6 shows a process for optimizing messages in accordance with embodiments of the invention.

FIG. 6 shows an example process 600 for optimizing messages in accordance with an embodiment of the invention. In block 602, information about a user of a social networking system is collected. In block 604, the information is used to train a machine learning model for determining likelihood of a desired action by the user in response to candidate messages. In block 606, scores representing likelihoods that each of the candidate messages will cause the desired action by the user are computed. In block 608, a message associated with a selected likelihood of causing the desired action is provided. In block 610, the message is scheduled in a batch based on a day of the week and a time interval during which the message is to be sent. In block 612, the machine learning model is updated with changed information about the user. In block 614, the machine learning model is updated with action taken by the user in response to the message. In an embodiment, after block 614, the process 600 can continue to any of blocks 602, 604, 606, 608, 610, 612, or 614.

In an embodiment of the invention, the process 600 may be entirely or partially performed by the messaging optimization module 150. In an embodiment of the invention, the process 600 may be performed at least in part by the social networking system 130.

CONCLUSION

Figure 7:
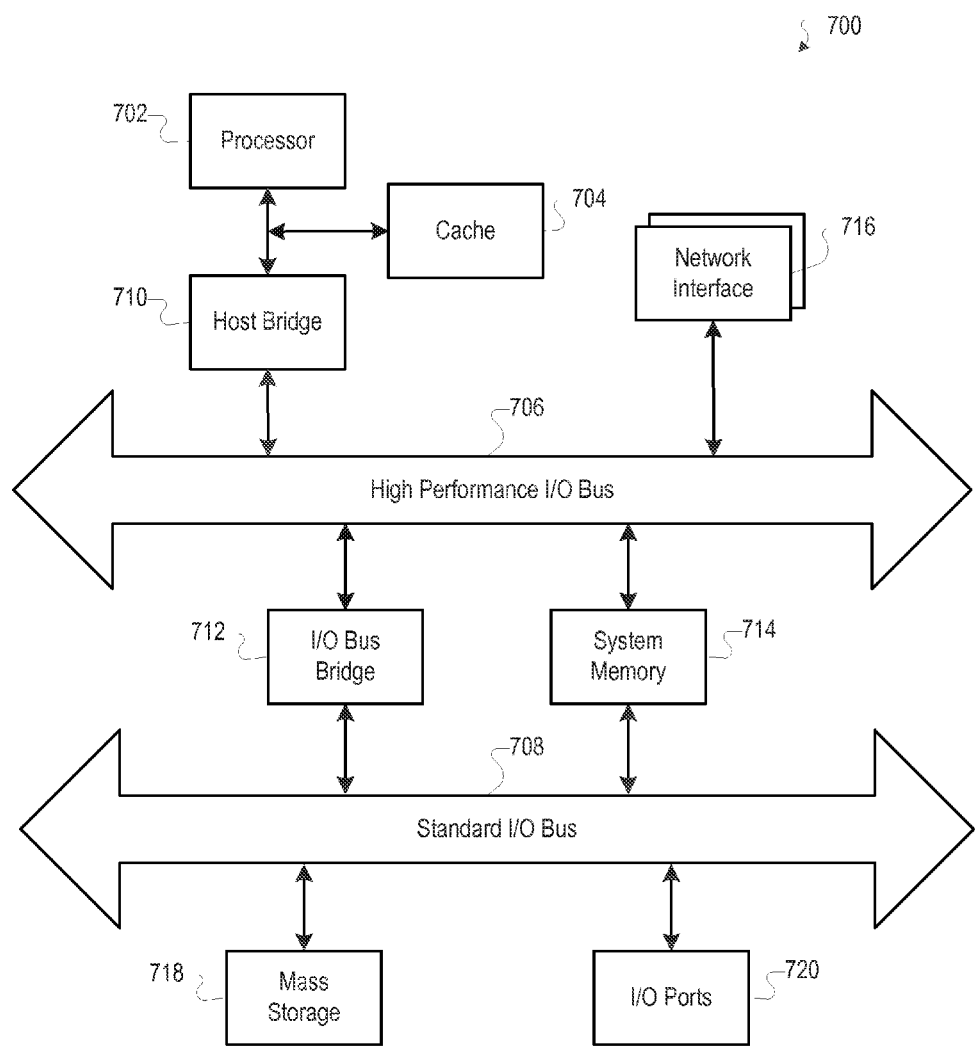
FIG. 7 shows a diagram of a computer system in accordance with an embodiment of the invention.

The foregoing processes and features can be implemented by a wide variety of machine and computer system architectures and in a wide variety of network and computing environments. FIG. 7 illustrates an example of a computer system 700 that may be used to implement one or more of the computing devices identified above. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 130, the user device 110, the external system 120, or a component thereof. In an embodiment of the invention, the computer system 700 may be one server among many that constitutes all or part of the social networking system 130.

The computer system 700 includes a processor 702, a cache memory 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples the processor 702 to the high performance I/O bus 706, whereas I/O bus bridge 712 couples the two buses 706 and 708 to each other. A system memory 714 and one or more network interfaces 716 couple to the bus 706. The computer system 700 may further include video memory and a display device coupled to the video memory (not shown). Mass storage 718 and I/O ports 720 couple to the bus 708. The computer system 700 may optionally include a keyboard and pointing device, a display device, or other input/output devices (not shown) coupled to the bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System; the Apple Macintosh Operating System, available from Apple Computer Inc. of Cupertino, Calif.; UNIX operating systems; Microsoft® Windows® operating systems; BSD operating systems; and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Furthermore, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 which, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714, and then accessed and executed by processor 702.

Examples of computer readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", or the like means that a particular feature, design, structure, or characteristic described in connection with the embodiment is included in at least one embodiment of the disclosure. The appearances of, for example, the phrase "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    determining a user profile including information describing characteristics of a user of a social networking system;
    identifying a message response prediction model for the user, the message response prediction using information from the user profile and response information about the user's responses to messages sent by the social networking system, the response information based at least in part on one or more attributes of content items included in the sent messages and a time when the messages were sent by the social networking system to the user;
    selecting a plurality of candidate messages to generate a desired response by the user;
    for each candidate message, determining a likelihood of the user performing the desired response by applying the message prediction model for the user to the candidate message, the likelihood indicating how the user will respond to the candidate message based at least in part on attributes of one or more content items included in the candidate message and when the candidate message is sent to the user;
    selecting, by the computer system, a candidate message based at least in part on the determined likelihoods; and
    sending, by the computer system, the selected candidate message to the user at a specified time based at least in part on the determined likelihood.

2. The method of claim 1, wherein the information describing characteristics of the user includes at least one of user demographics, behavior of the user, and behavior of friends of the user.

3. The method of claim 2, wherein the user demographics include at least one of age, location, birthplace, birth date, home town, current town, country, race, weight, height, marital status, gender, income level, job, educational degrees, and schools attended.

4. The method of claim 2, wherein the behavior of the user includes at least one of date and time of activities of the user, types of activities of the user, extent of activities of the user, and responses of the user to previous messages provided by the social networking system.

5. The method of claim 2, wherein the behavior of friends of the user includes at least one of date and time of activities of the friends, types of activities of the friends, and extent of activities of the friends.

6. The method of claim 1, further comprising updating the message response prediction model for the user with changed information about the user.

7. The method of claim 6, wherein the updating is performed periodically during a selected interval.

8. The method of claim 6, wherein the updating is performed continuously during a selected interval.

9. The method of claim 1, further comprising updating the message response prediction model for the user with action taken by the user in response to the message.

10. The method of claim 1, wherein the information describing characteristics of the user is based on a selected period of time.

11. The method of claim 1, further comprising associating each of a plurality of message predictions models with each of a plurality of users of the social networking system.

12. The method of claim 1, further comprising generating a message response prediction model for a group of users, including the user, of the social networking system.

13. The method of claim 1, further comprising computing scores representing a likelihood the at least one candidate message will cause the user to perform the desired response.

14. The method of claim 13, wherein the scores are based on at least one attribute of the message.

15. The method of claim 14, wherein the at least one attribute includes at least one of a day of the week the message is to be sent, a time the message is to be sent, and a type of content to be included in the message.

16. The method of claim 13, wherein the scores are numerical values.

17. The method of claim 1, wherein the selected candidate message is associated with a highest probability of causing the user to perform the desired response to receiving selected candidate message.

18. The method of claim 1, further comprising scheduling the message in a batch based on a day of the week and a time interval during which the message is to be sent.

19. A non-transitory computer-storage medium storing computer-executable instructions that, when executed, cause a computer system to perform a computer-implemented method comprising:
determining a user profile including information describing characteristics of a user of a social networking system;
identifying a message response prediction model for the user, the message response prediction using information from the user profile and response information about the user's responses to messages sent by the social networking system, the response information based at least in part on one or more attributes of content items included in the sent messages and a time when the messages were sent by the social networking system to the user;
selecting a plurality of candidate messages to generate a desired response by the user;
for each candidate message, determining a likelihood of the user performing the desired response by applying the message prediction model for the user to the candidate, the likelihood indicating how the user will respond to the candidate message based at least in part on attributes of one or more content items included in the candidate message and when the candidate message is sent to the user;
selecting a candidate message based at least in part on the determined likelihoods; and
sending the selected candidate message to the user at a specified time based at least in part on the determined likelihood of the selected candidate message.

20. A system comprising:
at least one processor; and
a memory storing instructions configured to instruct the at least one processor to:
determine a user profile including information describing characteristics of a user of a social networking system;
identify a message response prediction model for the user, the message response prediction using information from the user profile and response information about the user's responses to messages sent by the social networking system, the response information based at least in part on one or more attributes of content items included in the sent messages and a time when the messages were sent by the social networking system to the user;
select a plurality of candidate messages to generate a desired response by the user;
for each candidate message, determine a likelihood of the user performing the desired response by apply the information about the user to train a model for determining likelihood of causing a desired action by the user in response to at least one candidate message which may be provided for the user;
select a candidate message based at least in part on the determined likelihoods; and
provide send the selected candidate message to the user at a specified time based at least in part on the determined likelihood.

21. The method of claim 1, further comprising training the message response prediction model using information from the user profile and response information about the user's responses to messages sent by the social networking system.

* * * * *

UNITED STATES PATENT AND TRADEMARK OFFICE
CERTIFICATE OF CORRECTION

| | | |
|---|---|---|
| PATENT NO. | : 8,924,326 B2 | Page 1 of 1 |
| APPLICATION NO. | : 13/485784 | |
| DATED | : December 30, 2014 | |
| INVENTOR(S) | : Lex Arquette et al. | |

It is certified that error appears in the above-identified patent and that said Letters Patent is hereby corrected as shown below:

Claims

Column 24, Claim 20, line 49, delete "provide send the selected candidate" and insert --send the selected candidate--.

Signed and Sealed this
Twenty-second Day of March, 2016

Michelle K. Lee
*Director of the United States Patent and Trademark Office*